United States Patent
Lemmers, Jr. et al.

(10) Patent No.: US 9,695,926 B2
(45) Date of Patent: Jul. 4, 2017

(54) ACCESSORY DRIVE GEAR HUB FOR A DIFFERENTIAL

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 16 days.

(21) Appl. No.: 14/678,333

(22) Filed: Apr. 3, 2015

(65) Prior Publication Data

US 2016/0290473 A1    Oct. 6, 2016

(51) Int. Cl.
| | | |
|---|---|---|
| *F16H 48/06* | (2006.01) | |
| *F16H 57/00* | (2012.01) | |
| *F16D 1/06* | (2006.01) | |
| *F16H 57/037* | (2012.01) | |
| *F16H 57/08* | (2006.01) | |
| *F16H 57/02* | (2012.01) | |
| *F16H 47/04* | (2006.01) | |

(52) U.S. Cl.
CPC .......... *F16H 57/0025* (2013.01); *F16D 1/06* (2013.01); *F16H 48/06* (2013.01); *F16H 57/037* (2013.01); *F16H 47/04* (2013.01); *F16H 57/082* (2013.01); *F16H 2057/02043* (2013.01)

(58) Field of Classification Search
CPC .. F16D 1/06; F16D 47/04; F16H 2051/02046; F16H 57/082; F16H 57/037; F16H 48/06; F16H 48/10
USPC ......... 475/220, 248, 331; 74/606 R
See application file for complete search history.

(56) References Cited

U.S. PATENT DOCUMENTS

| | | |
|---|---|---|
| 2,288,206 A | 6/1942 | Pierpont |
| 3,043,090 A | 7/1962 | Sundt |
| 3,527,121 A | 9/1970 | Moore |
| 4,252,035 A | 2/1981 | Cordner et al. |
| 4,488,053 A | 12/1984 | Cronin |
| 4,609,842 A * | 9/1986 | Aleem .......... H02K 19/38 310/112 |
| 4,617,835 A | 10/1986 | Baker |
| 4,734,590 A | 3/1988 | Fluegel |
| 4,953,663 A | 9/1990 | Sugden |

(Continued)

*Primary Examiner* — Roger Pang
(74) *Attorney, Agent, or Firm* — Cantor Colburn LLP

(57) ABSTRACT

Embodiments herein relate to piece-part, sub-assembly, assembly, and component levels of a differential composed of a sun gear configuration and utilized in an integrated drive generator. An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

20 Claims, 7 Drawing Sheets

(56) References Cited

U.S. PATENT DOCUMENTS

| | | |
|---|---|---|
| 4,965,477 A | 10/1990 | Stadler et al. |
| 5,028,803 A | 7/1991 | Reynolds |
| 5,472,383 A | 12/1995 | McKibbin |
| 5,728,022 A | 3/1998 | Schultz |
| 5,845,731 A | 12/1998 | Buglione et al. |
| 6,178,840 B1 | 1/2001 | Colbourne et al. |
| 6,258,004 B1 | 7/2001 | Johnston |
| 6,799,953 B2 | 10/2004 | Nelson |
| 6,893,208 B2 | 5/2005 | Frosini et al. |
| 7,195,578 B2 | 3/2007 | Dalenberg et al. |
| 7,472,547 B2 | 1/2009 | Grosskopf et al. |
| 8,187,141 B2 | 5/2012 | Goleski et al. |
| 8,267,826 B2 * | 9/2012 | Duong ................. F16H 57/042 475/159 |
| 8,485,936 B2 | 7/2013 | Makulec et al. |
| 8,925,421 B2 | 1/2015 | Vanderzyden et al. |
| 9,115,794 B2 | 8/2015 | Vanderzyden et al. |
| 9,410,572 B2 | 8/2016 | Shoup et al. |
| 2004/0042698 A1 | 3/2004 | Yamamoto et al. |
| 2005/0006164 A1 | 1/2005 | Teraoka |
| 2006/0205560 A1 * | 9/2006 | Meier ................. F16H 55/17 475/331 |
| 2008/0108471 A1 * | 5/2008 | Deutsch ................. F16H 48/08 475/160 |
| 2009/0101465 A1 | 4/2009 | Hart et al. |
| 2009/0203492 A1 * | 8/2009 | Okabe ................. F16H 57/082 475/331 |
| 2010/0167863 A1 | 7/2010 | Lemmers, Jr. |
| 2010/0284836 A1 | 11/2010 | Grosskopf et al. |
| 2011/0105270 A1 | 5/2011 | Matsuoka et al. |
| 2013/0068057 A1 | 3/2013 | Grosskoph |
| 2013/0260951 A1 | 10/2013 | Norem et al. |
| 2013/0288840 A1 | 10/2013 | Grosskopf et al. |
| 2014/0008170 A1 | 1/2014 | Vanderzyden et al. |
| 2014/0130356 A1 | 5/2014 | Jiang et al. |
| 2015/0013488 A1 | 1/2015 | Matsuoka et al. |
| 2015/0125277 A1 | 5/2015 | Ward |
| 2016/0003339 A1 | 1/2016 | Roberts, III et al. |
| 2016/0016368 A1 | 1/2016 | Kunishima |
| 2016/0032969 A1 | 2/2016 | Kovach et al. |
| 2016/0215815 A1 | 7/2016 | Ryu et al. |

* cited by examiner

ACCESSORY DRIVE GEAR HUB FOR A DIFFERENTIAL

BACKGROUND OF THE INVENTION

Exemplary embodiments pertain to integrated drive generators and, more particularly, to a differential with a sun gear configuration for an integrated drive generator.

In general, aircraft electric power generation utilizes a hydro-mechanical transmission that receives a power input, at variable speed, from an engine to drive a generator at a constant speed. The hydro-mechanical transmission includes a differential to convert the variable speed of the engine to the constant speed for the generator.

At present, a configuration of the differentials used in the hydro-mechanical transmission for aircraft electric power generation is a two ring gear configuration. The two ring gear configuration includes a first ring gear to first planet gear mesh, a first planet gear to second planet gear mesh, and second planet gear to second ring gear mesh configuration. The two ring gear configuration has a specific differential ratio of one (1) due to the first and second planet gears being the same size. This specific differential ratio limits the two ring gear configuration to a lower input speed range. In addition, the two ring gear configuration forces specific packaging arrangements of the hydro-mechanical transmission. Particularly, the differential must be side-to-side with a hydraulic unit and include gearing between the differential and the hydraulic unit.

BRIEF DESCRIPTION OF THE INVENTION

According to one embodiment of the present invention, an accessory drive gear hub for an integrated drive generator is provided. The accessory drive gear hub comprises a gear body having a first diametric wall, a second diametric wall, and an interior platform that connects the first and second diametric walls, wherein the interior surface includes a plurality of interior surface holes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
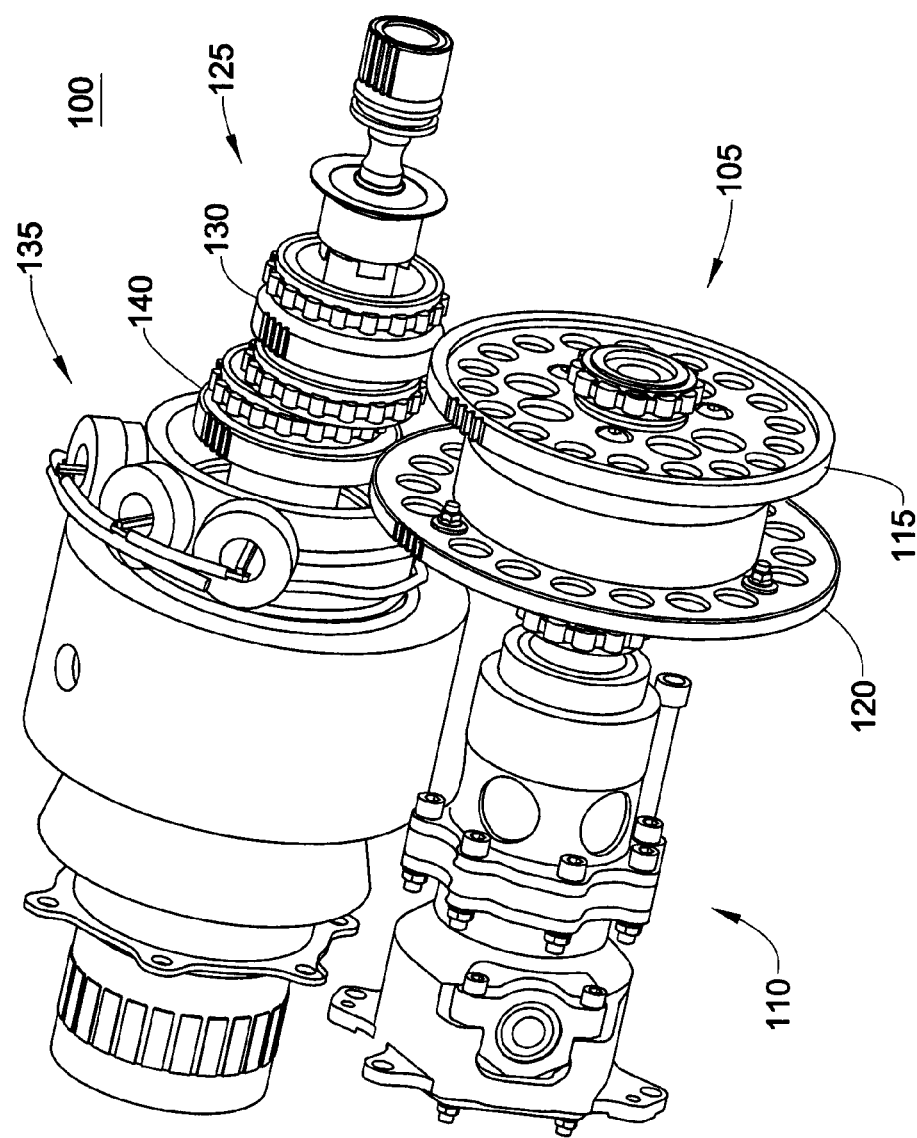
FIG. 1 depicts a perspective view of a differential of and integrated drive generator.

In contrast to the sun-less differential type described above, embodiments herein relate to piece-part, sub-assembly, assembly, and component levels of a differential composed of a sun gear configuration and utilized in an integrated drive generator.

An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

The differential can include speed members, such as a carrier shaft, which supports the planet gears; a sun gear; and a ring gear. The carrier shaft is driven based on the variable speed input from the engine. Note that the speed of the carrier shaft can be directly proportional to the engine speed. The carrier shaft through the planet gears drives the sun gear, which in turn drives the ring gear. The sun gear itself is independently varied (e.g., actively controlled) so that as the variable speed of the carrier shaft is transferred to the sun gear, the ring gear can be driven at a constant speed. The ring gear, thus, drives the synchronous salient pole generator at the constant speed output.

To actively control the sun gear, a piston, pump, and motor set of the hydraulic unit are utilized to vary a speed of the sun gear. The piston, pump, and motor set can be a back-to-back axial piston pump configuration, where one portion is a motor and the other portion is a pump. A first portion of the back-to-back axial piston pump configuration is driven proportionally off the speed of the engine (e.g., similar to the carrier shaft) and utilizes a variable swash plate to control displacement of the first portion. Note that based on the angle of the variable swash plate and whether that angle is a negative or positive sign the first portion can be a pump or a motor. Thus, the first portion drives or is driven by a fixed displacement pump (e.g., a second portion of the back-to-back axial piston pump configuration), which in turn controls the sun gear speed.

In view of the above, the differential of the integrated drive generator comprises a specific differential ratio (e.g., at or close to 0.5) that enables the receipt of any input speed along an extensive range. In this way, the integrated drive generator can be utilized in a high speed pad of an aircraft electric power generation system. In addition, the differential enables packaging advantages for the integrated drive generator, such as enabling the differential to be in-line with the hydraulic unit (e.g., enables coaxial packaging), which eliminates gearing between the sun gear and the hydraulic unit and reduces a size of a front region of the integrated drive generator.

Turning now to FIG. 1, a perspective view of an integrated drive generator 100 (e.g., epicyclic gear train that performs electrical power generation and speed component) that comprises a differential 105. The differential 105 includes an input driven gear 115 and an output driven gear 120 (not that these gear spins at a constant speed). The differential 105 is in-line with a hydraulic unit 110, which may include two pumps. The input driven gear 115 of the differential 105 is operatively coupled to an input system 125 via input drive gear 130. The output driven gear 120 of the differential 105 is operatively coupled to a generator 135 (e.g., main stator where electricity is generated) via a driven gear 140. Based on this operative coupling, the differential 105 converts a variable speed input from the input system 125 supplied by a variable speed drive source into a constant speed output employed to drive generator 135. The variable speed drive source can be an aircraft engine; however, it should be understood, that the variable speed drive source may take on a variety of forms.

Figure 2:
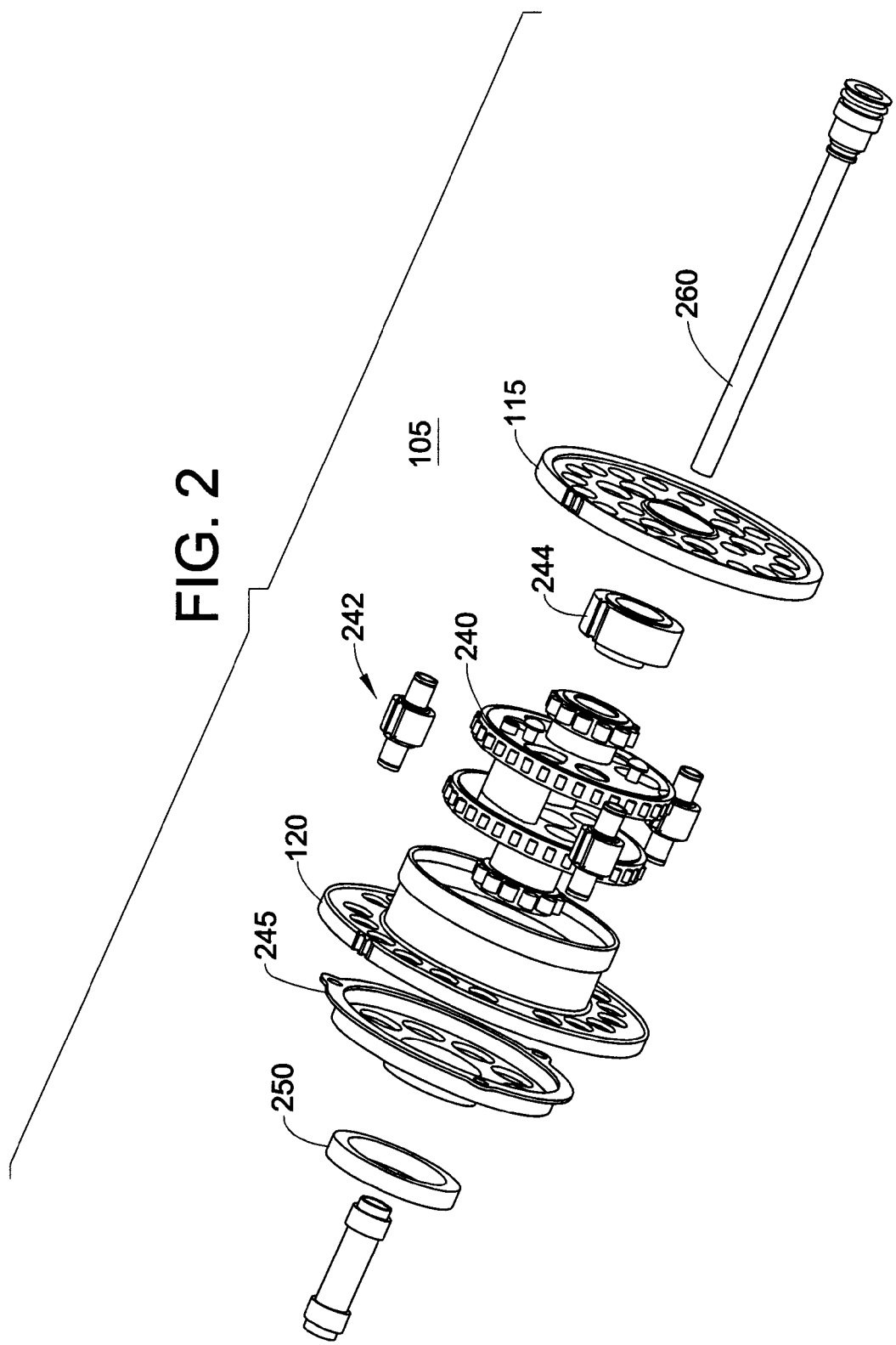
FIG. 2 depicts an exploded view of the differential of FIG. 1.

FIG. 2 depicts an exploded view of the differential 105, which includes the input driven gear 115, the output driven gear 120, a carrier shaft 240, a planet gear system 242, a sun gear 244, an accessory drive gear hub 245, an accessory drive gear 250, a first shaft 255 that spins at a fixed speed, a second shaft 260 that spins at a variable speed, and journal bearings (not shown). The input driven gear 115 is operatively connected to the sun gear 244. The sun gear 244, along with the planet gear system 242, is supported by the carrier shaft 240. The carrier shaft 240 is coupled to the output driven gear 120, which is engages the driven gear 140 on generator 135. The output driven gear 120 is further operatively coupled to the accessory drive gear hub 245, which supports the accessory drive gear 250.

In general, a gear body of the accessory drive gear hub 245 can include a first diametric wall that has inner and outer portions and a second diametric wall that has an inner and outer portion, whether the first diametric wall includes a wall hole. The first and second diametric walls can be connected by a platform, which also has inner and outer portions, that may include a plurality of surface holes. The second diametric wall can be adjacent to a rim or flange portion that includes a fastening holes for attaching the accessory drive gear hub 245 to the output driven gear 120. The accessory drive gear hub 245 will now be described below with reference to FIGS. 3-7.

Figure 3:
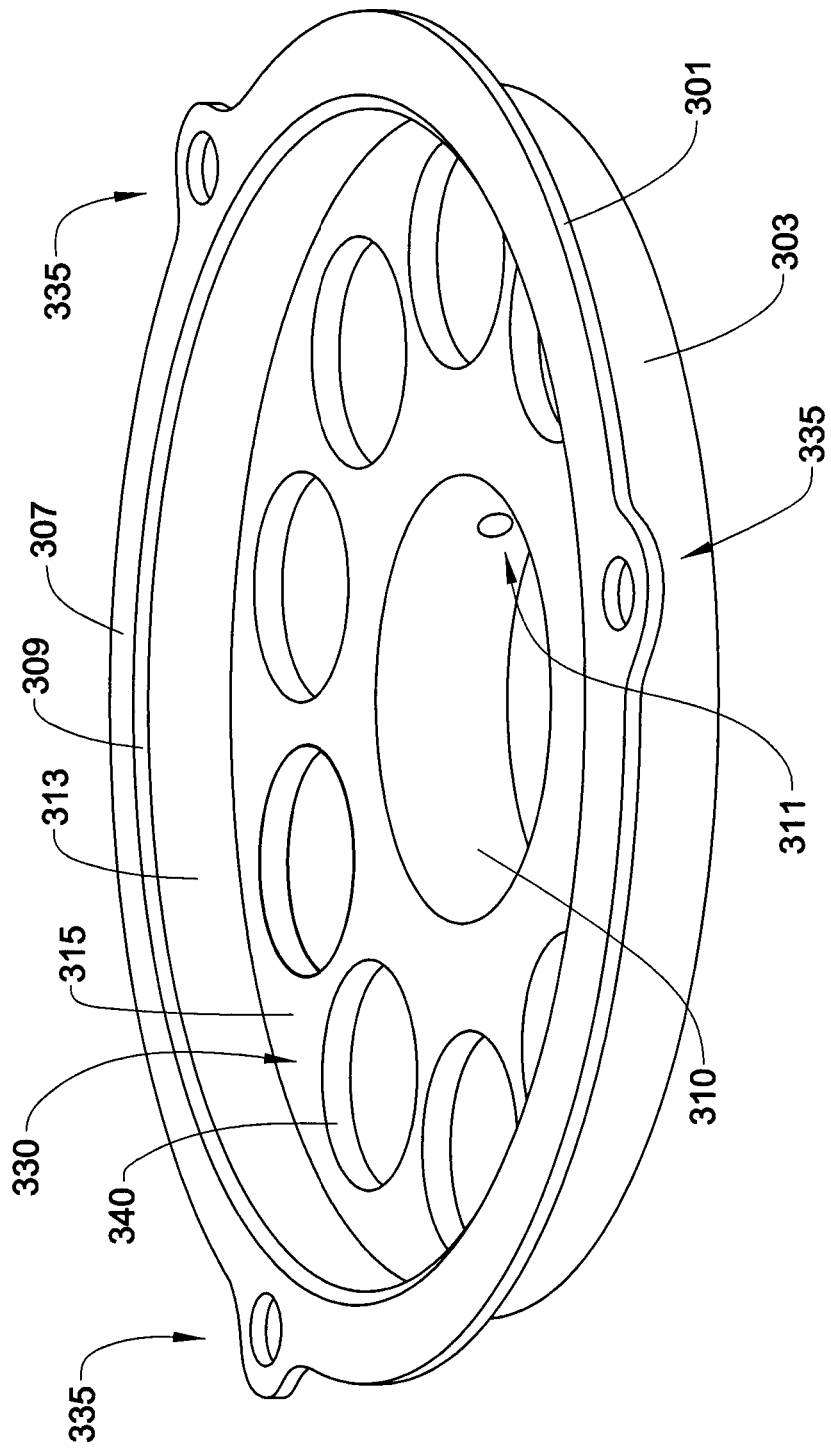
FIG. 3 illustrates an isometric view of an accessory drive gear hub.

FIG. 3 illustrates an isometric view of an accessory drive gear hub 245. The accessory drive gear hub 245 comprises a gear body having a first outer diametric wall 301, a second outer diametric wall 303, a bottom surface 307, an edge surface 309, a first inner diametric wall 310, a first inner diametric wall hole 311, a second inner diametric wall 313, an interior surface 315, a plurality of interior surface holes 330, and a plurality of fastening holes 335. The diameter of the input driven gear 115 can be between 5 to 6 inches (e.g., 5.0).

The plurality of interior surface holes 330 may be circumferentially aligned in a pattern on the accessory drive gear hub 245. For example, the plurality of interior surface holes 330 may total 10 and be symmetrically spaced about a geometric center of the accessory drive gear hub 245. The plurality of interior surface holes 330 can add structural stability and/or decrease the total mass of the accessory drive gear hub 245. Each interior surface holes 330 may have an inner hole wall 340.

The plurality of fastening holes 335 are configured for attaching the input accessory drive gear hub 245 to the output driven gear 120. In accordance with an aspect of an embodiment, fasteners (e.g., any combination of screws, pins, and bolts) may be utilized to make this attachment. The plurality of fastening holes 335 may total 3 and may be symmetrically spaced about the geometric center of the accessory drive gear hub 245.

Figure 4:
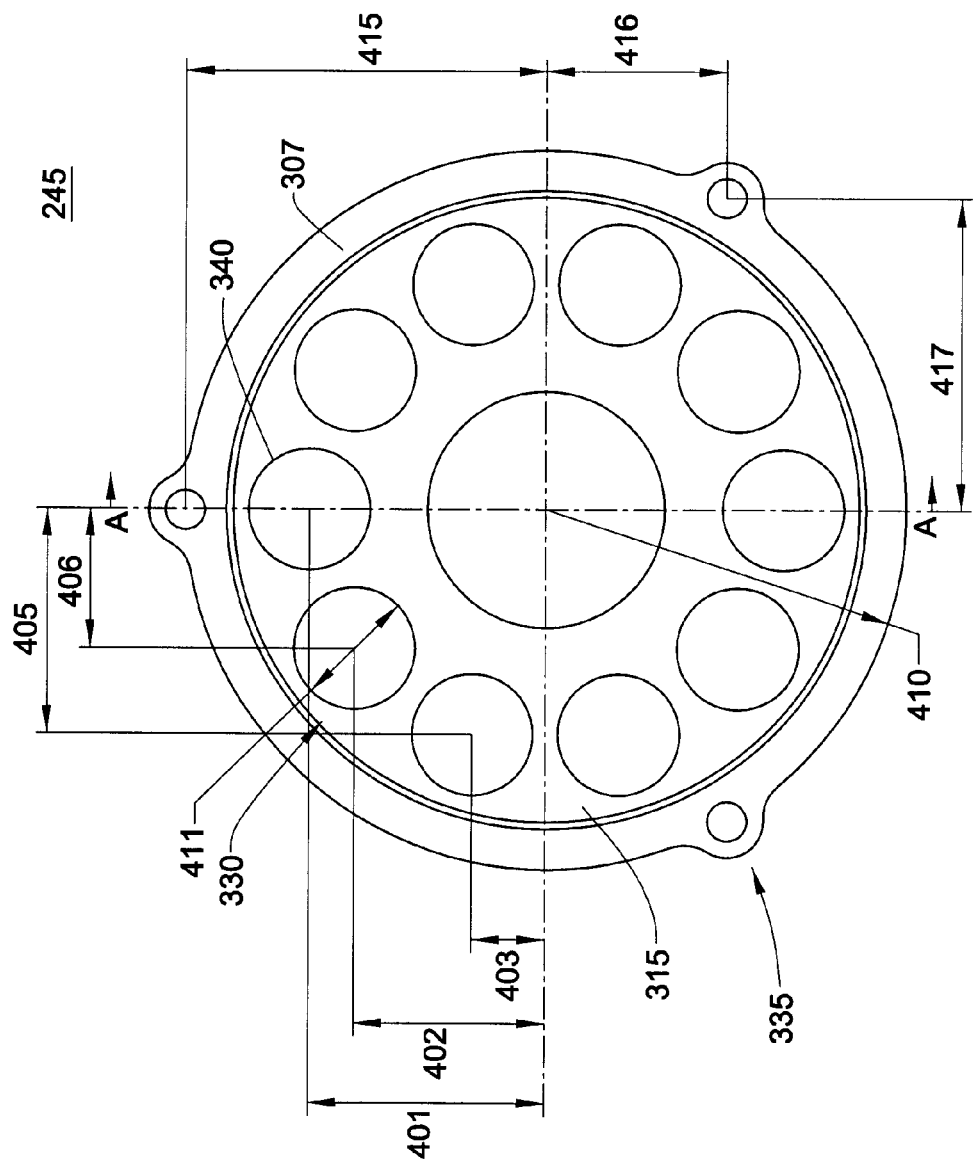
FIG. 4 illustrates a bottom up view of an accessory drive gear hub.
Figure 5:
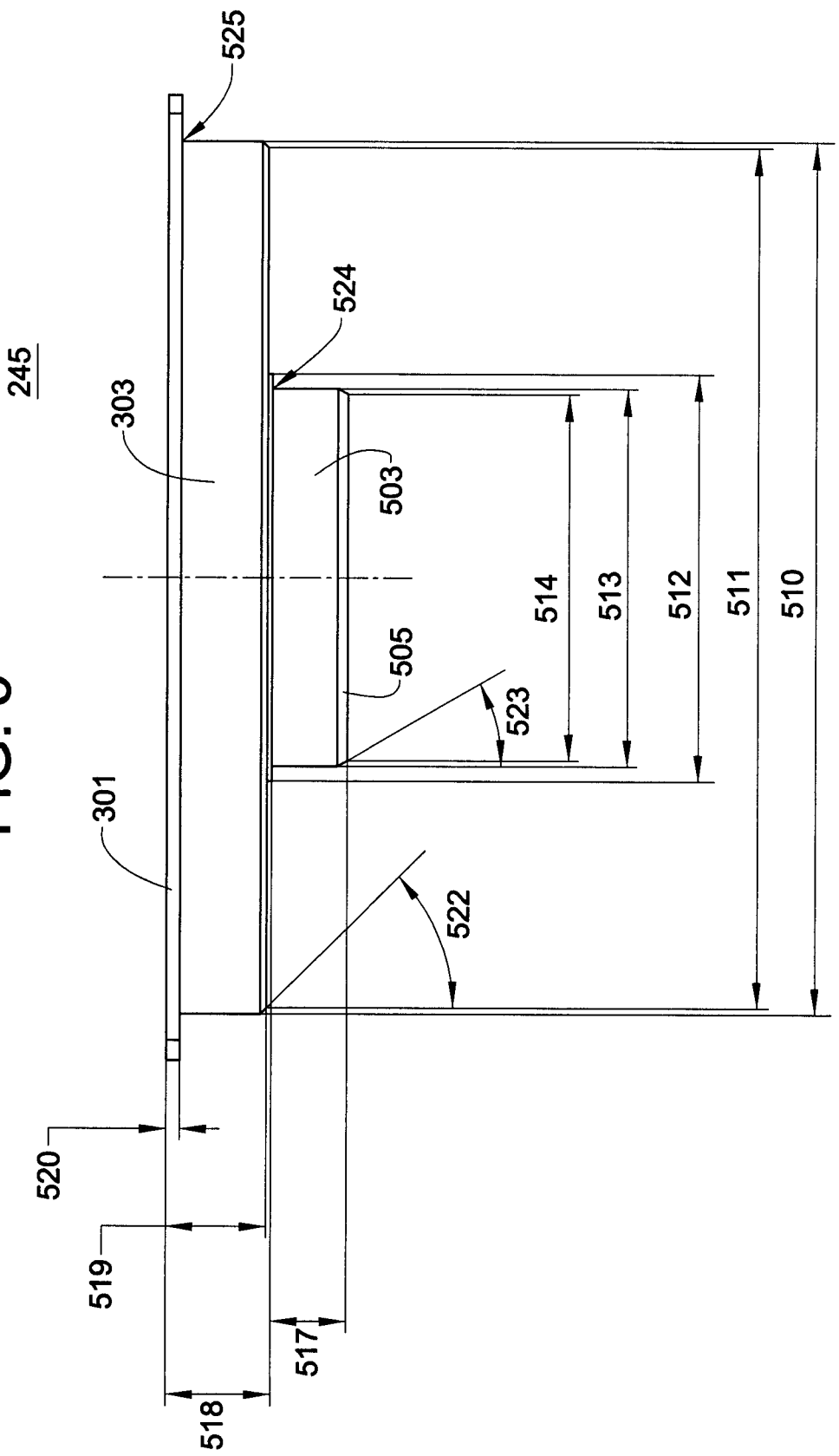
FIG. 5 illustrates a side view of an accessory drive gear hub.

FIG. 4 illustrates a bottom up view of an accessory drive gear hub; FIG. 5 illustrates a side view of the accessory drive gear hub 245. Each demarcation is illustrative of a particular portion of the accessory drive gear hub 245. For instance, in FIG. 4, demarcations 401-403 illustrate distances between geometric centers of a select set of the plurality of interior surface holes 330 and an X-axis. Demarcations 405, 406 illustrate distances between geometric centers of the select set of the plurality of interior surface holes 330 and a Y-axis (note that hole 331a is one the Y-axis). Demarcation 410 illustrates a radius from the geometric center of the accessory drive gear hub 245 to the first outer diametric wall 301. Demarcation 411 illustrates a diameter of one of the plurality of interior surface holes 330.

In some embodiments, the demarcation 401 can be about 1.6 inches (e.g., 1.640); the demarcation 402 can be about 1.3 inches (e.g., 1.327); the demarcation 403 can be about 0.5 inches (e.g., 0.507); the demarcation 405 can be about 1.5 inches (e.g., 1.560); and the demarcation 406 can be about 0.9 inches (e.g., 0.964). Further, in some embodiments, the demarcation 410 can be about 2.5 inches (e.g., 2.500), while the demarcation 411 can be about 0.5 inches (e.g., 0.850).

Further, demarcations 415, 416, 417 assist in illustrating location for the plurality of fastening holes 335. As shown in FIG. 4, a first fastening hole is located on the Y-axis. The first fastening hole is designated by demarcation 415, which illustrates a distances between a geometric center of the fastening hole 335 and the geometric center of the accessory drive gear hub 245. The first fastening hole is designated by demarcations 416, 417, which illustrate distances between a geometric center of the fastening hole 335 and the X-axis and Y-axis, respectively. For example, in some embodiments, the demarcation 415 can be about 2.4 inches (e.g., 2.480); the demarcation 416 can be about 1.2 inches (e.g., 1.240); and the demarcation 417 can be about 2.148 inches (e.g., 2.148).

FIG. 5 illustrates a side view of the accessory drive gear hub 245 that includes a third outer diametric wall 503 and an edge surface 505, along with a plurality of demarcations. Each demarcation is illustrative of a particular portion of the accessory drive gear hub 245. For instance, in FIG. 5, demarcations 510-514 illustrate diameters of different portions of the accessory drive gear hub 245, while demarcations 517-520 illustrate heights of different portions of the accessory drive gear hub 245. In addition, demarcations 522, 523 illustrate angles of surfaces adjacent to the third outer diametric wall 503 and the second outer diametric wall 303, and demarcations 524, 525 identify a groove or curved bevel adjacent to the third outer diametric wall 503 and the second outer diametric wall 303. Note that any surface connecting any of the various edges and walls of the accessory drive gear hub 245 may be independently angled at any slope at or between 15 degrees to 75 degrees. Alternatively, any of the edges may respectively be a wall and another surface.

In some embodiments, the demarcation 510 can be about 4.5 inches (e.g., 4.520); the demarcation 511 can be about 4.460 inches (e.g., 4.460); the demarcation 512 can be about 2.1 inches (e.g., 2.110); the demarcation 513 can be about 1.9 inches (e.g., 1.9550); and the demarcation 514 can be about 1.8 inches (e.g., 1.895). Further, in some embodiments, the demarcation 517 can be about 0.3 inches (e.g., 0.385), the demarcation 518 can be about 0.5 inches (e.g., 0.534), the demarcation 519 can be about 0.5 inches (e.g., 0.508), and the demarcation 520 can be about 0.1 inches (e.g., 0.065). The angle of the demarcations 522, 523 can be about 45 and 30 degrees, respectively. The demarcations 524, 525 may illustrate a 0.030 or 0.030 inch turn between the adjacent surfaces.

Figure 6:
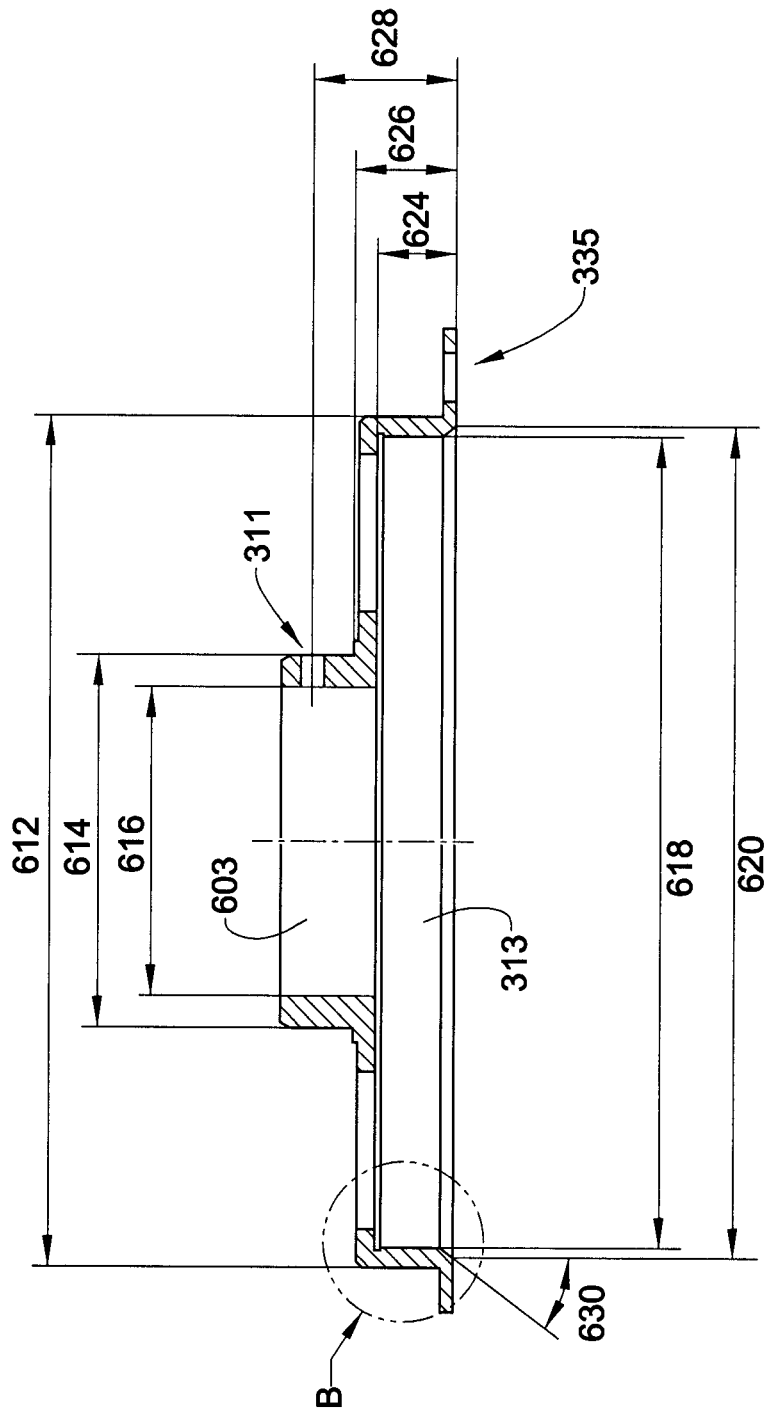
FIG. 6 illustrates a cross sectional view of an accessory drive gear hub.

FIG. 6 illustrates a cross sectional view of the accessory drive gear hub 245, which includes a third inner diametric wall 603, across the line A-A as illustrated in FIG. 4. In FIG. 6, the dimension of the accessory drive gear hub 245 are illustrated by demarcations, where demarcation 612 is a diameter of the second outer diametric wall 303, demarcation 614 is a diameter of the third outer diametric wall 503, demarcation 616 is a diameter of the third inner diametric wall 603, demarcation 618 is a diameter of the second inner diametric wall 313, and demarcation 620 is a diameter of where the bottom surface 307 meets the edge surface 309. In accordance with an aspect of an embodiment, the demarcation 612 can be about 4.5 inches (e.g., 4.520); the demarcation 614 can be about 1.9 inches (e.g., 1.942); the demarcation 616 can be about 1.6 inches (e.g., 1.650); the demarcation 618 can be about 4.3 inches (e.g., 4.3201); the demarcation 620 can be about 4.4 inches (e.g., 4.420).

FIG. 6 also includes additional demarcations, where demarcation 624 is a height of the accessory drive gear hub 245 from the bottom surface 307 to the interior surface 315, demarcation 626 is a height of the accessory drive gear hub 245 from the bottom surface 307 to a rim at the base of the third outer diametric wall 503, and demarcation 628 is a height of is a height of the accessory drive gear hub 245 from the bottom surface 307 to a geometric center of the first inner diametric wall hole 311. In accordance with an aspect of an embodiment, the demarcation 624 can be about 0.4 inches (e.g., 0.408); the demarcation 626 can be about 0.5 inches (e.g., 0.534); and the demarcation 628 can be about 0.7 inches (e.g., 0.740). In addition, demarcation 630 illustrates an angle of surface 309. Note that any surface connecting any of the various edges and walls of the accessory drive gear hub 245 may be independently angled at any slope at or between 15 degrees to 75 degrees. Alternatively, any of the edges may respectively be a wall and another surface. The angle of the demarcation 630 can be about 45 degrees.

Figure 7:
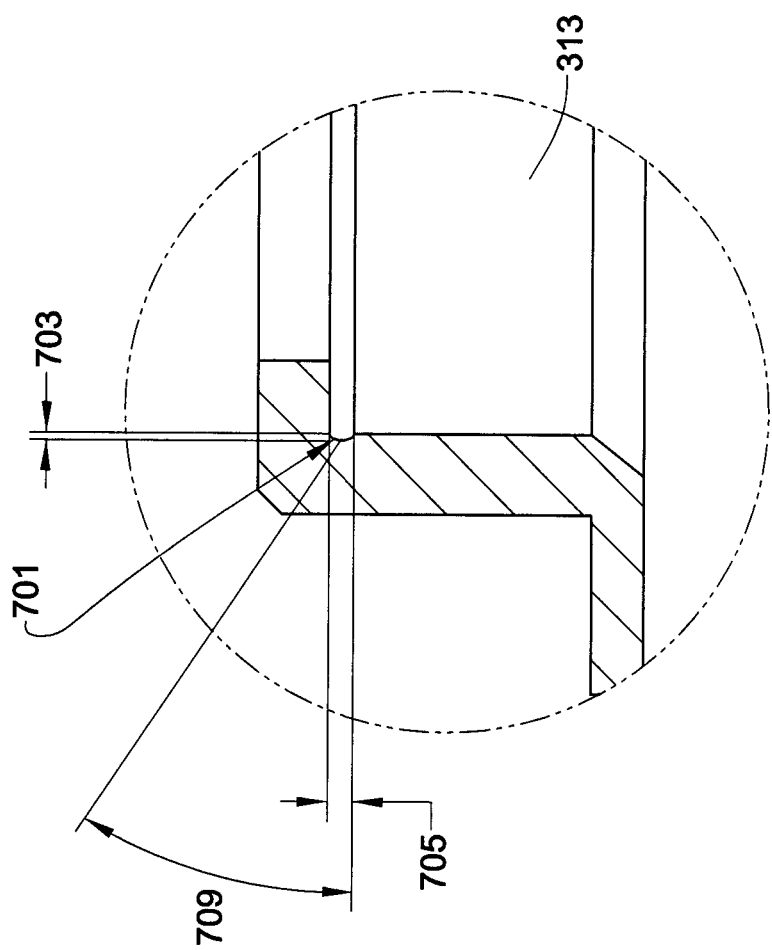
FIG. 7 illustrates a magnified view of a portion of the cross sectional view of the accessory drive gear hub FIG. 6.

FIG. 7 illustrates a magnified view of the cross section of the accessory drive gear hub 245 of FIG. 6 with the circle B. In FIG. 7, the magnified view depicts a groove 701 between the second inner diametric wall 313 and the interior surface 315. Further, additional dimensions of the accessory drive gear hub 245 are illustrated by demarcations. Demarcation 703 is a depth of the groove 701; demarcation 705 is a width of the groove 701, and demarcation 709 is an angle of a groove slope. In some embodiments, the demarcation 703 can be about 0.01 inches (e.g., 0.010); the demarcation 705 can be about 0.04 inches (e.g., 0.040); and the angle of the demarcation 709 can be 45 degrees.

In this way, the gear body of the accessory drive gear hub can include a first diametric wall that has inner and outer portions (e.g., the first inner diametric wall 310 and the third inner diametric wall 603) and a second diametric wall that has an inner and outer portion (e.g., the second inner diametric wall 313 and second outer diametric wall 303), whether the first diametric wall includes a wall hole (e.g., a first inner diametric wall hole 311). The first and second diametric walls can be connected by a platform, which also has inner and outer portions (e.g., the interior surface 315 and the third inner diametric wall 603), that may include a plurality of surface holes (e.g., the plurality of interior surface holes 330). The second diametric wall can be adjacent to a rim or flange portion (e.g., a combination the first outer diametric wall 301, a bottom surface 307, an edge surface 309) that includes a fastening holes (e.g., a plurality of fastening holes 335) for attaching the accessory drive gear hub to the output driven gear 120.

The terminology used herein was chosen to best explain the principles of the embodiments, the practical application or technical improvement over technologies found in the marketplace, or to enable others of ordinary skill in the art to understand the embodiments disclosed herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. Furthermore, the term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An accessory drive gear hub for an integrated drive generator, comprising:
   a gear body having a first diametric wall, a second diametric wall, and an interior platform that connects the first and second diametric walls,
   wherein the interior platform includes a plurality of interior surface holes; and
   a flange includes at least one of a plurality of fastening holes configured to attach the accessory drive gear hub to a gear,
   wherein the accessory drive gear hub is included in a differential of the integrated drive generator,
   wherein the differential is operatively coupled to an input system via an input drive gear, and
   wherein the differential is operatively coupled to a generator via an output driven gear.

2. The accessory drive gear hub of claim 1, wherein a height of the flange is 0.1 inches.

3. The accessory drive gear hub of claim 1, wherein the first diametric wall includes a wall hole.

4. The accessory drive gear hub of claim 3, wherein a distance between a geometric center of wall hole to and a surface of the flange is 0.74 inches.

5. The accessory drive gear hub of claim 1, wherein a diameter of an inner wall portion of the first diametric wall is 1.6 inches.

6. The accessory drive gear hub of claim 1, wherein a diameter of an inner wall portion of the second diametric wall is 4.3 inches.

7. The accessory drive gear hub of claim 1, further comprising:
   a groove that connects the first diametric wall and the interior platform.

8. The accessory drive gear hub of claim 7, wherein the groove includes a depth of 0.01 inches and a width of 0.04 inches.

9. The accessory drive gear hub of claim 1, wherein a height of the first diametric wall and an edge surface of the accessory drive gear hub is 0.3 inches.

10. The accessory drive gear hub of claim 9, wherein the edge surface is angled at 30 degrees.

11. The accessory drive gear hub of claim 1, wherein a number of the plurality of interior surface holes is 10.

12. The accessory drive gear hub of claim 11, wherein at least one of the plurality of interior surface holes has a diameter of 0.850 inches.

13. An accessory drive gear hub for an integrated drive generator, comprising:
   a gear body having a first diametric wall, a second diametric wall, and an interior platform that connects the first and second diametric walls,
   wherein the interior platform includes a plurality of interior surface holes; and
   a flange includes at least one of a plurality of fastening holes configured to attach the accessory drive gear hub to a gear,
   wherein the accessory drive gear hub is included in a differential of the integrated drive generator,
   wherein the differential is in-line with a hydraulic unit of the integrated drive generator, and
   wherein the hydraulic unit comprises at least one pump.

14. The accessory drive gear hub of claim 13, wherein a height of the flange is 0.1 inches.

15. The accessory drive gear hub of claim 13, wherein the first diametric wall includes a wall hole.

16. The accessory drive gear hub of claim 15, wherein a distance between a geometric center of wall hole to and a surface of the flange is 0.74 inches.

17. The accessory drive gear hub of claim 13, wherein a diameter of an inner wall portion of the first diametric wall is 1.6 inches.

18. The accessory drive gear hub of claim 13, wherein a diameter of an inner wall portion of the second diametric wall is 4.3 inches.

19. The accessory drive gear hub of claim 13, further comprising:
   a groove that connects the first diametric wall and the interior platform.

20. The accessory drive gear hub of claim 19, wherein the groove includes a depth of 0.01 inches and a width of 0.04 inches.

* * * * *